(12) United States Patent
Gilbert et al.

(10) Patent No.: US 11,057,191 B2
(45) Date of Patent: Jul. 6, 2021

(54) DATA RETENTION MANAGEMENT IN DATABASES

(71) Applicant: SAP SE, Walldorf (DE)

(72) Inventors: Johannes Gilbert, Karlsruhe (DE); Volker Lehnert, Karlsruhe (DE)

(73) Assignee: SAP SE, Walldorf (DE)

( * ) Notice: Subject to any disclaimer, the term of this patent is extended or adjusted under 35 U.S.C. 154(b) by 704 days.

(21) Appl. No.: 15/254,034

(22) Filed: Sep. 1, 2016

(65) Prior Publication Data

US 2018/0060343 A1  Mar. 1, 2018

(51) Int. Cl.
| | |
|---|---|
| G06F 16/21 | (2019.01) |
| G06F 16/22 | (2019.01) |
| G06F 16/31 | (2019.01) |
| G06F 16/14 | (2019.01) |
| H04L 9/06 | (2006.01) |
| G06F 21/64 | (2013.01) |
| G06F 21/62 | (2013.01) |
| G06Q 10/00 | (2012.01) |
| G06F 16/901 | (2019.01) |

(52) U.S. Cl.
CPC ............ *H04L 9/0643* (2013.01); *G06F 16/21* (2019.01); *G06F 21/62* (2013.01); *G06F 21/64* (2013.01); *G06F 16/152* (2019.01); *G06F 16/2255* (2019.01); *G06F 16/325* (2019.01); *G06F 16/9014* (2019.01); *G06F 2221/2143* (2013.01); *G06Q 10/00* (2013.01)

(58) Field of Classification Search
CPC ......... G06F 17/30117; G06F 17/30091; G06F 16/21; G06F 16/2255; G06F 16/325; G06F 16/9014; G06F 16/152; H04L 9/0643

See application file for complete search history.

(56) References Cited

U.S. PATENT DOCUMENTS

| | | | |
|---|---|---|---|
| 6,185,576 B1* | 2/2001 | McIntosh | G06F 16/30 |
| 2010/0106689 A1* | 4/2010 | Huslak | G06F 16/125 |
| | | | 707/662 |
| 2012/0124013 A1* | 5/2012 | Provenzano | G06F 16/1748 |
| | | | 707/692 |
| 2016/0085852 A1* | 3/2016 | Deshpande | G06F 16/955 |
| | | | 707/736 |

* cited by examiner

*Primary Examiner* — Matthew Ell
*Assistant Examiner* — Berhanu Mitiku
(74) *Attorney, Agent, or Firm* — Buckley, Maschoff & Talwalkar LLC

(57) ABSTRACT

An identifying data set is defined including semi-identifying attributes with semi-identifying attribute values corresponding to an entity. Descriptive records corresponding to the semi-identifying attributes are created. Based on the descriptive records, retention records with retention attributes are created. A composed retention attribute is generated based on applying cryptographic hash algorithms to the retention attributes stored in a database. A retention attribute description is generated with a category and payload corresponding to the composed retention attribute. The semi-identifying attributes with corresponding positions are stored in the retention attribute. Hashes corresponding to the retention attributes are computed based on a composing mechanism that includes logic to compute the hashes. The hashes are combined to generate the composed retention attribute. When a request is received to permanently delete the entity from the database, the entity may be permanently deleted from the database.

20 Claims, 9 Drawing Sheets

Identifying data set A 202
- First name
- Last name
- Date of birth

Identifying data set B 204
- Last name
- Street
- Postal code

Identifying data set C 206
- Last name
- IBAN

Identifying data set D 208
- Tax number

Descriptive data set A 210
- Descriptive record- First name 212
  - Data type: String
  - Minimum length: 0
  - Maximum length: 100
- Descriptive record- Last name 214
  - Data type: String
  - Minimum length: 0
  - Maximum length: 100
- Descriptive record- Date of birth 216
  - Data type: Date in format YYYY-MM-DD

Descriptive data set B 218
- Descriptive record- Last name 220
  - Data type: String
  - Minimum length: 0
  - Maximum length: 100
- Descriptive record- Street 222
  - Data type: String
  - Minimum length: 0
  - Maximum length: 100
- Descriptive record- Postal code 224
  - Data type: String
  - Minimum length: 0
  - Maximum length: 10

Descriptive data set C 226
- Descriptive record- Last name 228
  - Data type: String
  - Minimum length: 0
  - Maximum length: 100
- Descriptive record- IBAN 230
  - Data type: IBAN

Descriptive data set D 232
- Descriptive record- Tax number 234
  - Data type: String
  - Minimum length: 0
  - Maximum length: 40

DATA RETENTION MANAGEMENT IN DATABASES

FIELD

Illustrated embodiments generally relate to data processing, and more particularly to data retention management in databases.

BACKGROUND

Enterprises follow data retention policies or guidelines to organize and manage data, so that relevant data is retained for a specified period of time, and irrelevant data is deleted or archived after the specified period of time. Data retention refers to the concept of persisting data, meeting legal requirements and enterprise requirements. When a specific set of data is deleted or archived, that set of data is permanently lost. When the specific set of data is archived, the specific set of data is permanently deleted as soon as the archive is deleted. An enterprise may identify data 'X' to be no longer relevant, and data 'X' is deleted from a database to comply with a legal requirement. At a later point of time, data 'X' may be relevant based on a business requirement. Though data 'X' is relevant now, data 'X' cannot be retrieved from the database, since data 'X' was permanently deleted from the database. It is challenging to persist data without violating the data retention policies complying with the legal requirements and business requirements, and later retrieve on a need basis.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 2 is exemplary use case illustrating identifying data set and descriptive data set, according to one embodiment.

DETAILED DESCRIPTION

Embodiments of techniques for data retention management in databases are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
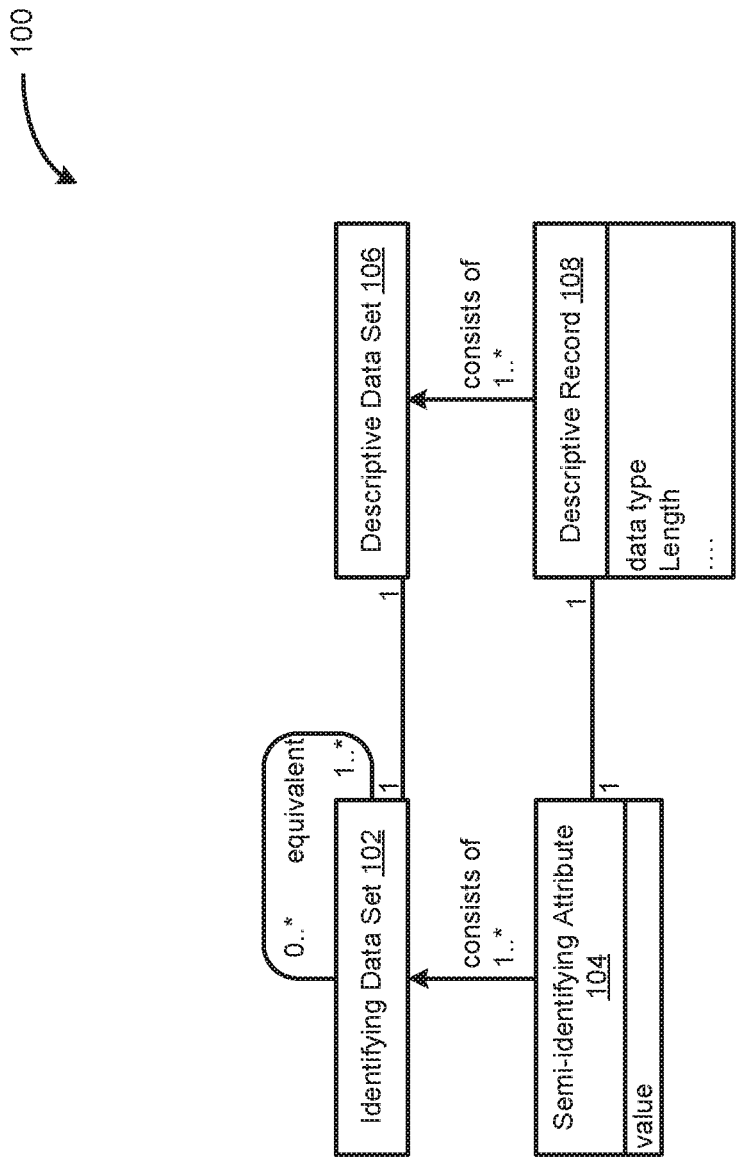
FIG. 1 is a UML diagram illustrating identifying data set and descriptive data, according to one embodiment.

FIG. 1 is UML diagram 100 illustrating identifying data set and descriptive data set, according to one embodiment. An enterprise may have various operational procedures like production planning, manufacturing, sales and distribution, accounting, after sales services, etc. To fulfill some of the operational procedures the enterprise may establish relationship with various business partners to identify customers, distributors, etc. The relationship may be in any form such as contract, agreement, bond, etc. The enterprise stores data associated with the business partners. For example, if a business partner is a person, attributes associated with the business partner such as social security number, name, age, street name, house number, zip-code, country, etc., are stored in a database. Certain attribute such as social security number is used to uniquely identify the person. While certain other attributes such as street name, house name, zip-code and country may help in identifying the person with a high probability. The set of attributes such as street name, house name, zip-code and country that help in identifying the person with a high probability are referred to as identifying data set 102. Certain attributes such as social security number that is used to uniquely/instantly identify the person are also referred to as identifying data set.

Identifying data set 102 may vary depending on the use case. For example, for identifying a person in a large city, it may be necessary to know the age, street name, house number as well as surname, whereas, to identify a person from a small town, age and street name may be sufficient. The identifying data set 102 consists of one or more semi-identifying attribute(s) 104. For example, age, street name, house number and surname are the semi-identifying attributes for the identifying data set. Identifying data set 102 consists of semi-identifying attribute 104. The semi-identifying attribute 104 has values corresponding to the individual semi-identifying attribute 104. In one embodiment, for a single use case of identifying a business partner, there may be more than one identifying data set. For example, to identify a person, a first identifying data set consists of semi-identifying attributes such as age, street name, house number and surname, and a second identifying data set consists of semi-identifying attributes such as street name, house number, zip-code and country. The second identifying data set is also referred to as an equivalent data set although the probability to identify the person correctly may vary.

Descriptive information associated with the semi-identifying attributes is stored in descriptive data set 106. For individual values in the semi-identifying attributes, descriptive record 108 is created. The descriptive data set 106 contains descriptive record 108. The descriptive data set 106 may contain numerous descriptive records. The descriptive record 108 contains information such as data type, length, database table, field, additional supporting information, etc. The additional supporting information may provide a comprehensive description on how the semi-identifying attribute value is to be interpreted.

FIG. 2 is exemplary use case 200 illustrating identifying data set and descriptive data set, according to one embodiment. An enterprise may store various entities such as customer related information. Customer entity usually consists of name, address, bank details, email address, phone number, tax number, etc. Identifying data set may be constructed based on the customer data. Identifying data set A 202 is constructed with semi-identifying attributes first name, last name and date of birth. Identifying data set B 204 is constructed with semi-identifying attributes last name, street and postal code. Identifying data set C 206 is constructed with semi-identifying attributes last name, and IBAN, and identifying data set D 208 is constructed with semi-identifying attribute tax number. Identifying data set A 202, identifying data set B 204, identifying data set C 206 and identifying data set D 208 are equivalent data sets. The equivalent data set is used based on the information received. For example, if we have a new customer with just tax number, the identifying data set D 208 may be selected, since the information in the identifying data set D 208 matches the information received from the new customer. In a scenario, where more than one identifying data set matches the information received, any number of the identifying data set can be selected. The definition of the identifying data set and semi-identifying attributes are stored in a database. Additional information such as creator, creation time stamp, modification time stamp, etc., is added to the identifying data set and the semi-identifying attributes.

Meta-data corresponding to the identifying data set is stored in a descriptive data set. A descriptive data set acts as a container of descriptive records. A descriptive record contains meta-data for a semi-identifying attribute. For example, definition or structure of a ten-digit tax number may change over a period of time to be a twelve-digit or fourteen-digit tax number. Unless a descriptive record is stored as ten-digit number for a semi-identifying attribute tax number, a user may assume the tax number to be a twelve-digit number. Therefore, unless a descriptive record is stored, it is challenging to use the semi-identifying attribute in a desired manner. Descriptive data set A 210 corresponds to the identifying data set A 202. Descriptive data set A 210 contains meta-data for semi identifying attributes first name, last name and date of birth. Descriptive record-first name 212 contains meta-data for the semi identifying attribute first name, descriptive record-last name 214 contains meta-data for the semi identifying attribute last name, and descriptive record-date of birth 216 contains meta-data for the semi identifying attribute date of birth. Descriptive record-first name 212 contains meta-data such as string data type, with '0' minimum length and '100' maximum length. Similarly, descriptive record-last name 214 contains meta-data such as 'string' data type, with '0' minimum length, and '100' maximum length, and descriptive record-date of birth 216 contains meta-data such as 'date format' data type. Similarly, descriptive data set B 218 corresponds to the identifying data set B 204, and the descriptive data set B 218 contains descriptive record-last name 220, descriptive record-street 222 and descriptive record-postal code 224. Descriptive data set C 226 corresponds to the identifying data set C 206, and the descriptive data set C 226 contains descriptive record-last name 228, and descriptive record-IBAN 230. Similarly, descriptive data set D 232 corresponds to the identifying data set D 208, and the descriptive data set D 232 contains descriptive record-tax number 234. The metadata shown above for the descriptive record are merely exemplary, any number of metadata may be available for the descriptive record.

Figure 3:
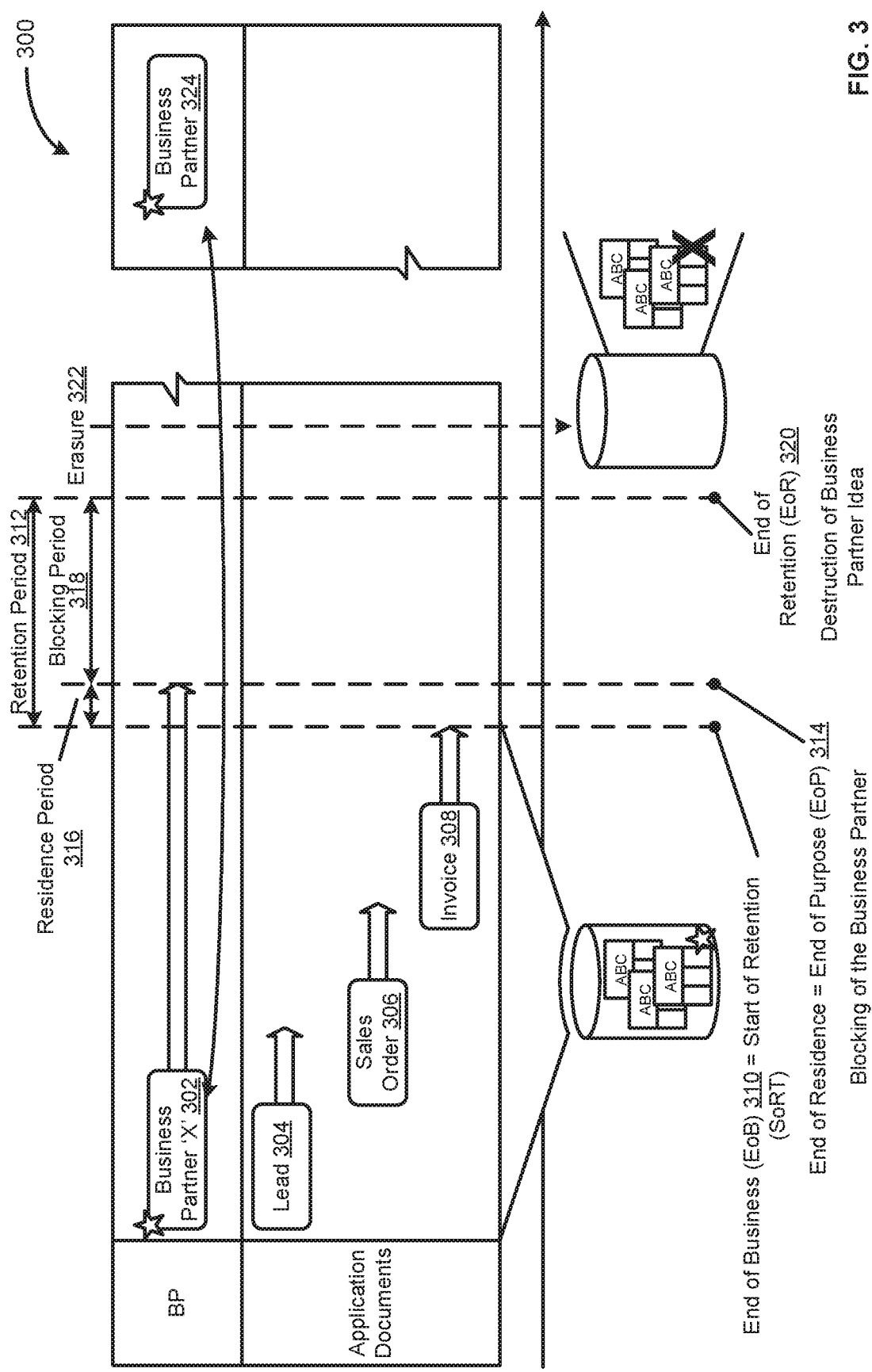
FIG. 3 is a block diagram illustrating data retention management for a business partner of an enterprise, according to one embodiment.

FIG. 3 is a block diagram illustrating data retention management 300 for a business partner of an enterprise, according to one embodiment. Some enterprise may choose to retain data for a period of time to comply with the legal requirements of the specific region or country. While, some enterprises may choose to retain data for a specified period of time to comply with their business requirements. Further, some enterprises may choose to retain data for a specified period of time to comply with a combination of legal requirements and business requirements. Data retention management 300 enables retaining data for a long period of time without violating the legal and business requirements. For example, an enterprise 'A' has an entity business partner 'X' 302 on contract to fulfill sales orders. Business partner 'X' 302 maintains application documents such as lead document 304 also referred to as sales lead that are prospective customers of a product or service, sales order document 306 generated after receipt of customer's purchase order, and invoice document 308 including purchase details. Data associated with business partner 'X' 302 may be referred to as master data records, and data associated with lead document 304, sales order document 306, and invoice document 308 may be referred to as transaction data records. Typically, enterprises retain master data records for a long period of time and transaction data records for a short period of time. Until the end of contract indicated by end of business (EoB) 310 with the business partner 'X' 302, the enterprise 'A' persists data corresponding to the master data records business partner 'X' 302 in database tables. The transaction data records such as lead 304, sales order 306 and invoice 308 may be deleted in a short period of time before the EoB 310. EoB 310 is also start of retention period (SoRT). Retention period 312 is a period or duration of time for which data is retained or stored before deletion of the entity. The process of retaining data for a specific duration of time before deleting is referred to as archiving.

End of residence or end of purpose (EoP) 314 is a period of time that has to elapse before archiving of application documents. The period between EoB 310 and the EoP 314 is referred to as residence period 316. After the EoP 314 elapses, the business partner 'X' is selected and blocked. After the EoP 314 period, blocking period 318 starts. In the blocking period 318, master data records that are no longer relevant for any business purpose are blocked. The application documents can be archived even before EoP 314 but are not deleted since it is still in the retention period 312. At end of retention (EoR) period 320, archives corresponding to business partner 'X' 302 are erased. This is shown by the period between EoR 320 and erasure 322.

Certain semi-identifying attributes associated with the business partner 'X' 302 such as business partner tax number, payment moral indicator, zip-code, country, etc., that helps in uniquely identifying the business partner 'X' 302, are referred to as identifying data set. Before the data associated with the business partner 'X' 302 is erased, hash values are generated for the individual semi-identifying attribute values. The generated hash values are stored in a database table along with a description of a fact about the corresponding business partner 'X' 302. Enterprise 'A' has identified that business partner 'X' 302 had defaulted payment, and was marked as partner with 'worst payment moral'. Therefore, the description of the fact corresponding to the business partner 'X' is stored as partner with a worst payment moral. After the hash values along with the description of facts are stored in the database table as retention record, application documents associated with the business partner 'X' 302 are deleted by deleting the archive(s). Therefore, entity business partner 'X' 302 is permanently deleted from the database tables by deleting the archive(s).

At a later point of time, when a partnership proposal is received from a business partner 324, business partner tax number of the business partner 324, is received and a hash is generated. The generated hash is matched with the hash values stored in the database table. A match is found with description 'worst payment moral', and displayed in a user interface, or provide in an appropriate format for further analysis. When a transaction data record with business partner tax number is received, hash is generated, and generated hash is matched with the hash values stored in the database table. When a match is determined the corresponding master data record business partner 'X' is identified as a partner with 'worst payment moral'. Accordingly, it is inferred that business partner 324 is business partner 'X' with worst payment moral, and hence enterprise 'A' may not proceed with the partnership. Thus, data associated with business partner 'X' was persisted long term in the form of retention record complying with the legal requirement and business requirement. It should be appreciated that the process explained above may be applicable completely or partially in various scenarios where deletion of data is involved.

Figure 4:
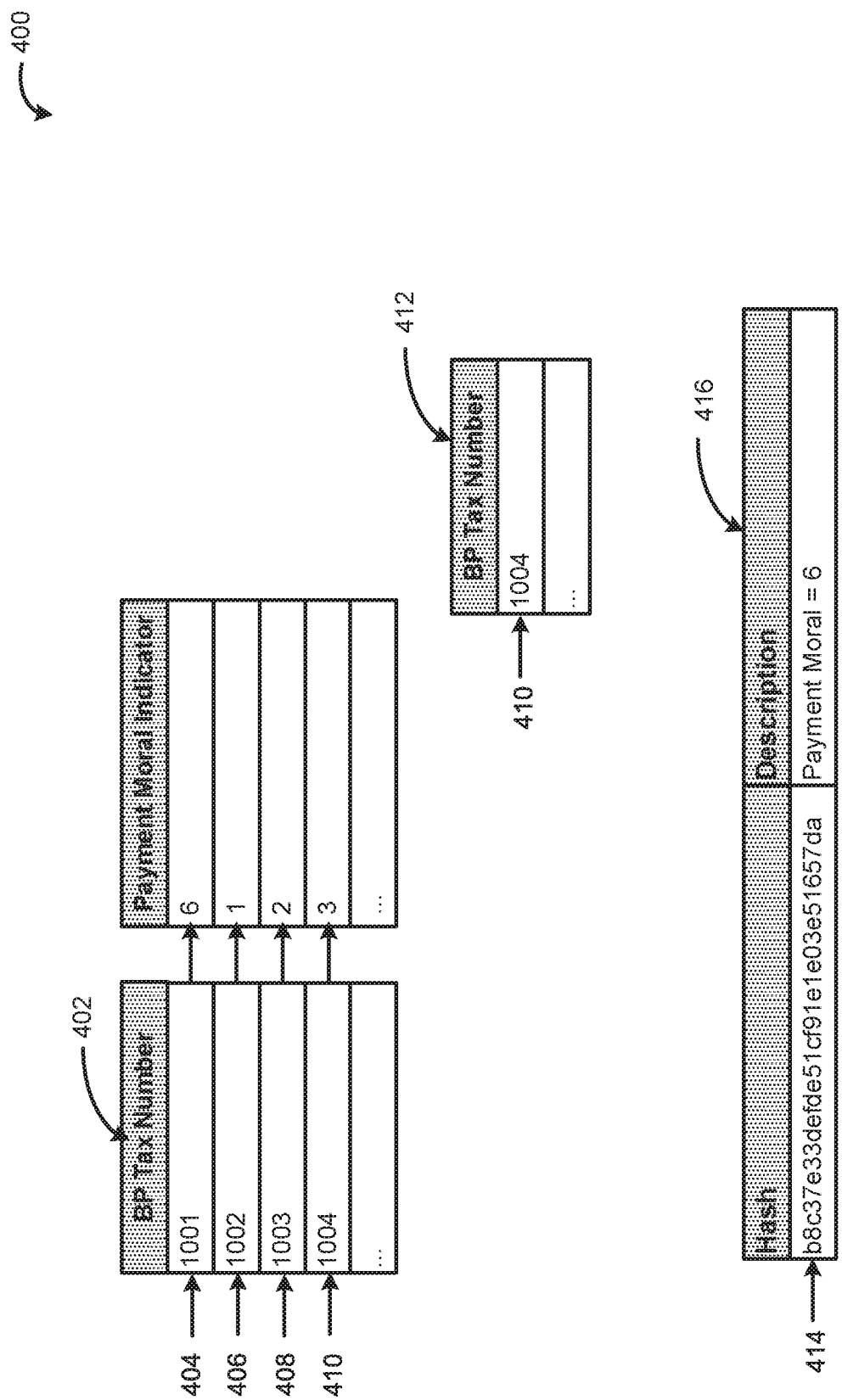
FIG. 4 is an exemplary use case illustrating data retention management by generation of hash for semi identifying attribute of a business partner of an enterprise, according to one embodiment.

FIG. 4 is exemplary use case 400 illustrating data retention management by generation of hashes for semi identifying attributes of a business partner of an enterprise, according to one embodiment. Consider an enterprise with multiple business partners. Individual business partners may be identified with unique 'BP tax number'. Identifying data set of business partners consists of 'BP tax number' as the semi-identifying attributes. Payment moral indicator '1' indicates best payment moral, and payment moral indicator '6' indicates worst payment moral. Table 402 shows the BP tax numbers of various business partners associated with the enterprise. Row 404 shows BP tax number '1001' associated with payment moral indicator '6' for business partner 'A'. Similarly for business partner 'B', in row 406, BP tax number '1002' is associated with payment moral indicator '1'. For business partner 'C', BP tax number '1003' is associated with payment moral indicator '2' as shown in row 408. For business partner 'D', BP tax number '1004' is associated with payment moral indicator '3' as shown in 410.

There is a business requirement to delete data associated with business partner 'A', business partner 'B' and business partner 'C'. Based on the business requirement, 'BP tax number' and data associated with business partner 'A', business partner 'B' and business partner 'C' are deleted retaining only data associated with business partner 'D' as shown in table 412. Table 412 is shown with BP tax number '1004' in row 410. The enterprise is also concerned that business partners with the worst payment moral be avoided in future. To avoid business partners with the worst payment moral, the enterprise may have to store the information corresponding to the business partners without violating business requirements. Accordingly, data associated with business partner 'A' is hashed and stored in table 416.

The hash value is generated for the BP tax number '1001'. The hash value may be generated using any cryptographic hash function or algorithm. When the input '1001' is provided to a cryptographic hash function, the hash value is generated. For example, for the BP tax number '1001', a hash value of 'b8c37e33defde51cf91e1e03e51657da' is generated using MD5 cryptographic hash algorithm. Row 414 with hash value 'b8c37e33defde51cf91e1e03e51657da' along with payment moral='6' is stored in table 416. Based on the hash value entry 'b8c37e33defde51cf91e1e03e51657da' in the table 416, the original BP tax number '1001' cannot be determined. Therefore, based on the entries in the table 416, actual values cannot be inferred. Thus, persisting the table 416 for a long term does not violate the legal requirements and the business requirements. The advantage of storing the hash value of the actual value is that the stored data may be helpful for future reference.

For example, a new customer approaches the enterprise as a business partner for a business transaction. The tax number associated with the new customer is converted to a hash value, and matched with the hash of a BP tax number stored in the table 416. The tax number associated with the new customer is 1001. The tax number '1001' of the new customer is converted to a hash value 'b8c37e33defde51cf91e1e03e51657da' using MD5 cryptographic hash algorithm. The converted value of the new customer matches with the hash value in row 414. The worst payment moral is indicated corresponding to the hash value in row 414. The enterprise may infer that the new customer was a past business partner to the enterprise with the worst payment moral. Therefore, the enterprise may choose to decline partnership with the new customer. Looking up the table 416, and identifying a matching hash value is possible only because the same original value was available again. However, if the new customer had a new tax number, a match may not have been identified in the table 416.

Figure 5:
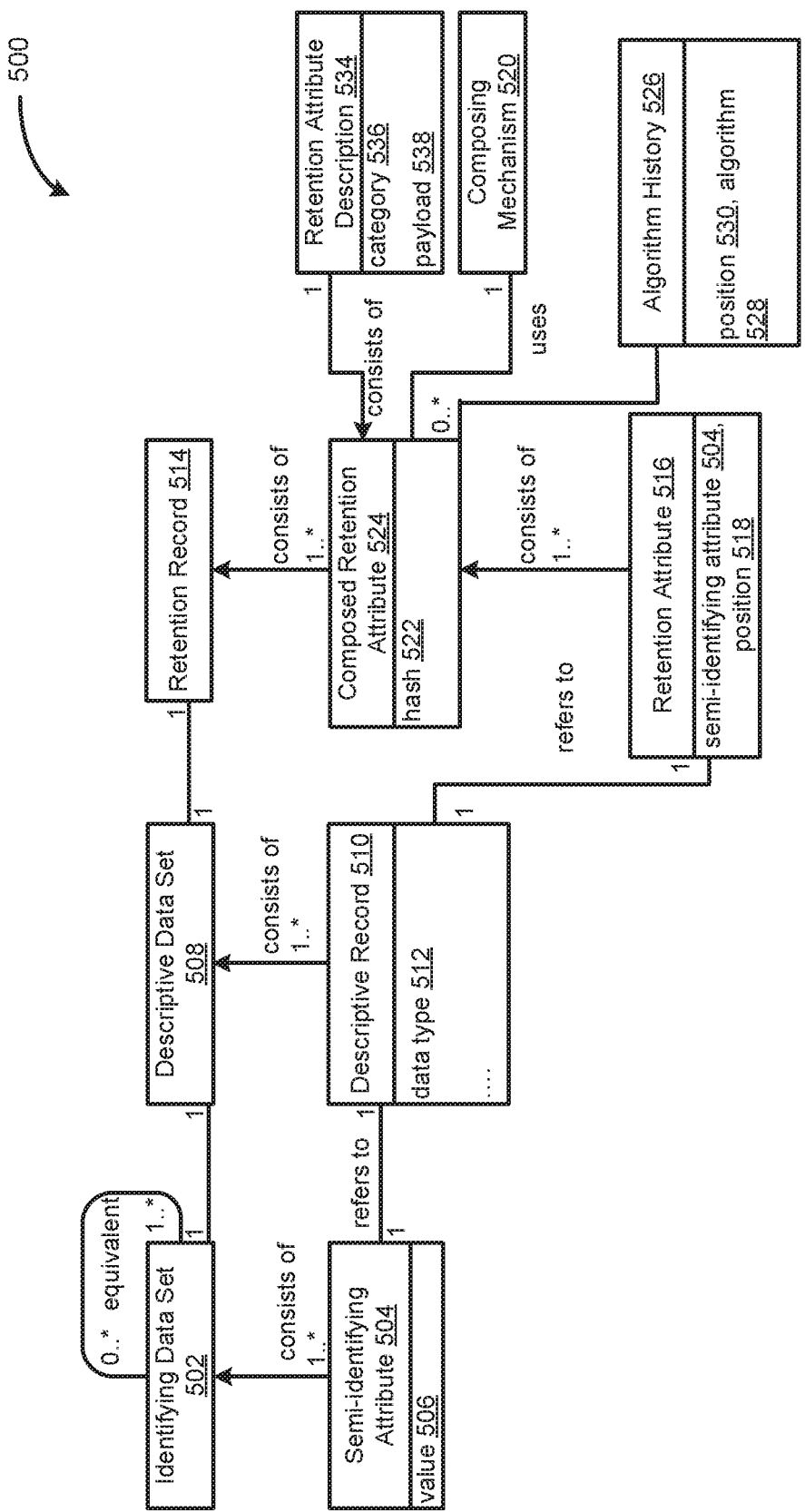
FIG. 5 is a UML diagram illustrating retention record and composing mechanism in data retention management, according to one embodiment.

FIG. 5 is UML diagram 500 illustrating retention record and composing mechanism in data retention management, according to one embodiment. Identifying data set 502 consists of semi-identifying attribute 504 with value 506. Descriptive data set 508 corresponds to the identifying data set 502. Descriptive data set 508 consists of descriptive record 510, and the descriptive record 510 contains metadata such as data type 512 of semi-identifying attribute 504. For individual descriptive record 510, retention record 514 is constructed. For individual descriptive record 510, retention attribute 516 is created. The retention attribute 516 stores the semi-identifying attribute 504 along with position 518 of the semi-identifying attribute 504. Cryptographic hash algorithm is used to generate hash for the retention attribute 516. Composing mechanism 520 defines how the retention attribute 516 is combined to generate hash 522 in composed retention attribute 524. Composing mechanism 520 may be a software program or software application in the form of a service, an API, etc. Composing mechanism may include logic to generate hashes, and combine the hashes or any other logic that is capable of combining input data, and generate a hash value out of it. Algorithm history 526 stores the name of algorithm 528 that is to be used on the combined hash along with the position 530.

Hash generated for individual retention attribute 516 is combined to generate hash 522. Individual retention attribute 516 corresponds to semi-identifying attribute 504. Hashes are generated for individual semi-identifying attribute values, and combined. Combining the hashes of each semi-identifying attribute value using one of the combining techniques is referred to as composing mechanism 520. Various composing mechanisms such as hash combination, hash composition, and mixture of hash combination and compositions may be used. In hash combination, hashes of semi-identifying attribute values are combined using some combination techniques such as bit-wise XOR combination, string concatenation, etc., and a new hash is generated. In hash composition, the hashes of semi-identifying attribute values are kept individually. The result is the presence of one or more hash values. In mixture of hash combination and composition, mixtures of both the techniques are used. When more than one semi-identifying attribute values are used, the number of dictionary entries for a brute-force attack increases. For example, when semi-identifying attributes first name and last name are concatenated or combined, and first name consists of 200000 names and the last name consists of 1000 numbers, this would lead to 200000*1000=200000000 possibilities, instead of 200000+1000=201000 possibilities. Retention record 514 consists of composed retention attribute 524. Composed retention attribute 524 consists of retention attribute description 534. Retention attribute description 534 consists of category 536 that specifies the category of information that was retained, and payload 538 specifies value corresponding to the category 536.

Figure 6:
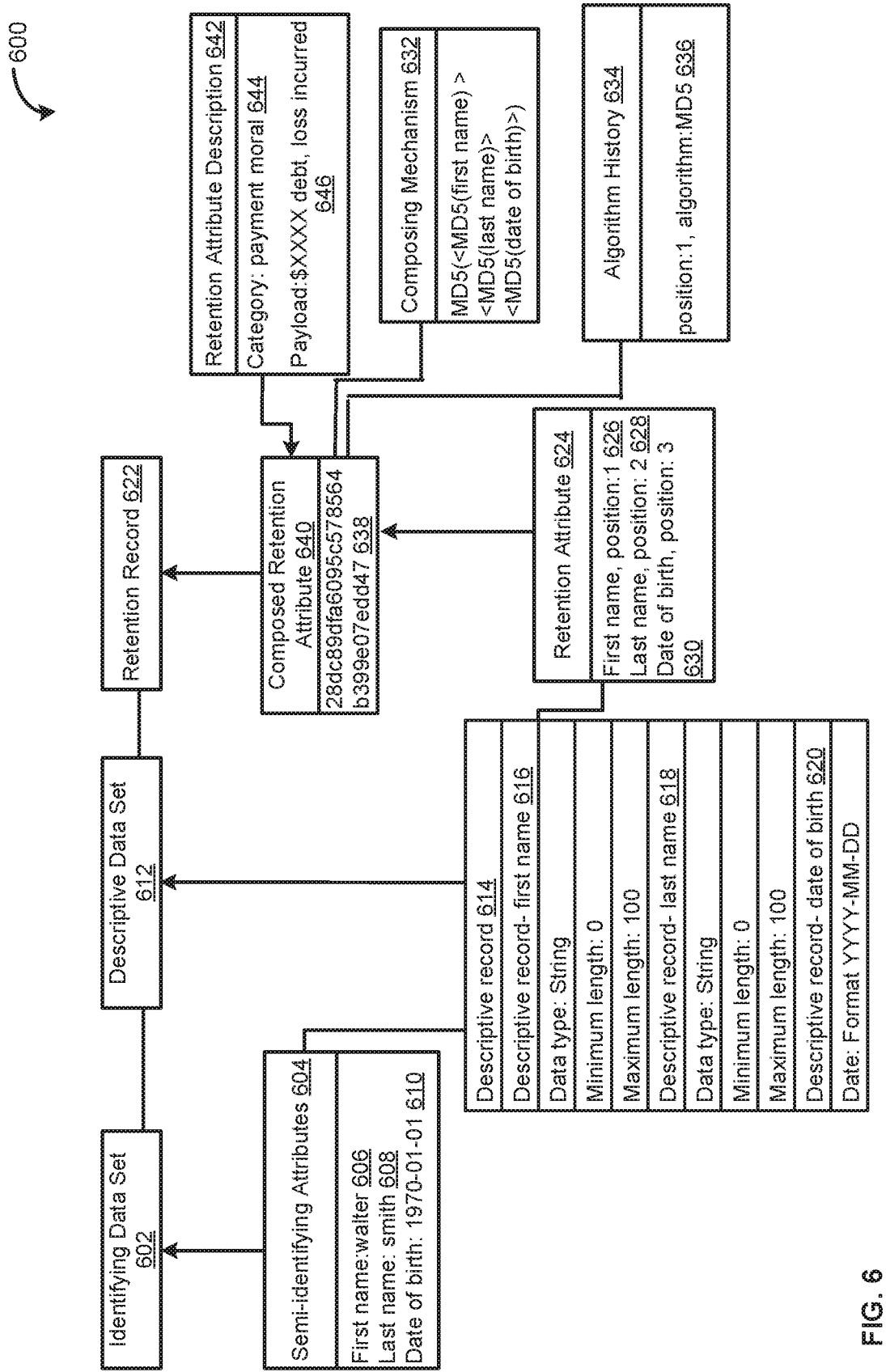
FIG. 6 is exemplary use case illustrating data retention management by generation of composed retention attribute, according to one embodiment.

FIG. 6 is exemplary use case 600 illustrating data retention management by generation of composed retention attribute, according to one embodiment. Identifying data set 602 consists of semi-identifying attributes 604 such as first name with value 'walter' 606, last name with value 'smith' 608, and date of birth with value '1970-01-01' 610. Descriptive data set 612 corresponds to the identifying data set 602. Descriptive data set 612 consists of descriptive record 614 that contains meta-data of semi-identifying attributes 604 first name, last name and date of birth. Descriptive record 614 contains descriptive record-first name 616 of string data type, with '0' minimum length and '100' maximum length, descriptive record-last name 618 of string data type, with '0' minimum length and '100' maximum length, and descriptive record-date of birth 620 of date format YYYY-MM-DD. For individual descriptive record 614, retention record 622 is constructed. For individual descriptive record 614, retention attribute 624 is created. For descriptive record-first name 616, retention attribute first name along with position is created as 'first name, position: 1' 626. Similarly for descriptive record-last name 618, retention attribute last name, position: 2 628, and for descriptive record-date of birth 620, retention attribute date of birth name, position: 3 630 is created.

Based on the position of retention attributes, the retention attributes are composed using composing mechanism 632. The composing mechanism 632 may be a software program or software application in the form of a service, an API, etc. Cryptographic hash algorithm is used to generate hashes for the individual attributes in the retention attribute 624. For example, a cryptographic hash algorithm MD5 is used to generate hashes for the individual attributes in the retention attribute 624. In the composing mechanism 632, the definition <MD5(first name)> is resolved as MD5(walter), and a hash is generated as 'e1229bab1c271df1796cb0c52ab9933'. Similarly, the definition <MD5(last name)> is resolved as MD5(smith), and a hash is generated as 'e95f770ac4fb91ac2e4873e4b2dfc0e6'. The definition <MD5(date of birth)> is resolved as MD5 (1970-01-01), and a hash is generated as '0c0fb6b2ee7dbb235035f7f6fdcfe8fb'.

Once individual hashes are calculated for individual retention attributes, the hashes are combined based on the definition (first name, last name, date of birth). Accordingly, the individual hashes corresponding to retention attributes first name, last name, date of birth, are combined as 'e1229bab1c271df1796cb0c52ab9933 e951770ac41b91ac2e4873e4b2dfc0e60c0fb6b2ee7dbb2350 35f7f6fdcfe8fb'. Hash of the combined hash values is generated. Algorithm history 634 stores the name of the hash algorithm to be used on the combined hash value along with position. Algorithm history 634 stores position: 1, and the name of the algorithm: MD5 636. Since, the algorithm history 634 has one algorithm entry MD5, only MD5 algorithm is used on the combined hash values to generate hash. Accordingly, MD5 of 'e1229bab1c271df1796cb0c52ab9933 e95f770ac4fb91ac2e4873e4b2dfc0e60c0fb6b2ee7dbb2350 35f7f6fdcfe8fb' is generated as '28dc89dfa6095c578564b399e07edd47' 638. The generated hash '28dc89dfa6095c578564b399e07edd47' 638 is stored in composed retention attribute 640. Retention attribute description 642 is created corresponding to the composed retention attribute 640. Retention attribute description 642 with category: payment moral 644 and payload: $XXXX debt, loss incurred 646 is created in the retention attribute description 642. When the retention record 622 is stored, composed retention attribute 640 with hash value '28dc89dfa6095c578564b399e07edd47' 638 is also stored. Composed retention attribute 640 is stored with the hash value '28dc89dfa6095c578564b399e07edd47' 638. Retention attribute description 642 is stored with category: payment moral 644 and payload: SXXXX debt, loss incurred 646. Composing mechanism 632 and algorithm history 634 are stored. Retention attribute 624 is stored with position and semi-identifying attributes without the actual values such as Walter, Smith, etc., thereby complying with legal and business requirement.

In one embodiment, an order is received from a new customer Z in the enterprise. Customer Z provides the following information while placing order, first name: walter, last name: smith, date of birth: 01.01.1970, street: hide park, city: daisytown, and email: walter.smith@someone.com. Since the enterprise had a legal and business requirement to delete data associated with the customers, the enterprise does not have any customer information stored. Based on the composed retention attribute 640, retention record 622 is identified. Based on the retention record 622, descriptive data set 612, and identifying data set 602 are identified. It is determined, if the data provided by customer Z matches descriptive record for any identifying data set. Matching is performed based on semi-identifying attributes first name, last name and date of birth. First name: walter, last name: smith, date of birth: 01.01.1970, provided by customer Z matches the identifying data set 602. Based on the descriptive record-first name 616, descriptive record-last name 618 and descriptive record-date of birth 620, data provided by customer Z is formatted. Accordingly, data of birth '01.01.1970' provided by customer Z is formatted to '1970-01-01' based on the format 'YYYY-MM-DD'. Position of the semi-identifying attributes is identified from the retention attribute 624. First name is in position '1', last name is in position '2' and date of birth is in position '3'. Based on the definition of the composing mechanism 632, hash is calculated for each value of semi-identifying attribute and combined. For the semi-identifying attribute 'walter' in first position, algorithm MD5 is applied, and MD5(walter) is calculated as 'e1229bab1c271d1f1796cb0c52ab9933'. For the semi-identifying attribute 'smith' in second position, algorithm MD5 is applied, and MD5(smith) is calculated as 'e95f770ac4fb91ac2e4873e4b2dfc0e6'. Similarly, for the semi-identifying attribute '1970-01-01' in third position, algorithm MD5 is applied, and MD5(1970-01-01) is calculated as '0c0fb6b2ee7dbb235035f7f6fdcfe8fb'. Combining the generated hashes, MD5 (e1229bab1c271d1f11796cb0c52ab9933 e95f770ac4fb91ac2e4873e4b2dfc0e60c0fb6b2ee7dbb2350 35f7f6fdcfe8fb) generates a hash '28dc89dfa6095c578564b399e07edd47'. The hash '28dc89dfa6095c578564b399e07edd47' generated based on customer Z matches the hash '28dc89dfa6095c578564b399e07edd47' 638 stored in composed retention attribute 640. Retention attribute description 642 corresponding to the composed retention attribute 640 is retrieved and displayed. Retention attribute description 642 with category: payment moral 644 and payload: SXXXX debt, loss incurred 646 is displayed in a user interface, and is available for further analysis. In one embodiment, the retention attribute description 642 may be processed automatically to perform appropriate action such as display a message, stop processing request from that customer, etc.

Various matching techniques such as case-insensitive character matching, number comparison, etc., may be used. Therefore, it is inferred that customer Z was in a working relationship with the enterprise. Based on the retention attribute description 642 associated with the composed retention attribute 640, it is also inferred that customer Z has a bad payment moral because of incurring loss to the enterprise due to the debt amount $XXXX. In one embodiment, a small change in the semi-identifying attribute value results in an entirely random and unpredictable change in the resulting hash. For example, the retention record was created with a value '1970-01-01' for the semi-identifying attribute date of birth. While generating composed retention attribute, if '1970.01.01' is used instead of '1970-01-01', an entirely random and unpredictable string may be generated. To avoid such errors and to improve the matching rate, the descriptive data set 612 along with descriptive record 614 may be included with numerous meta-data corresponding to the semi-identifying attributes 604.

Figure 7:
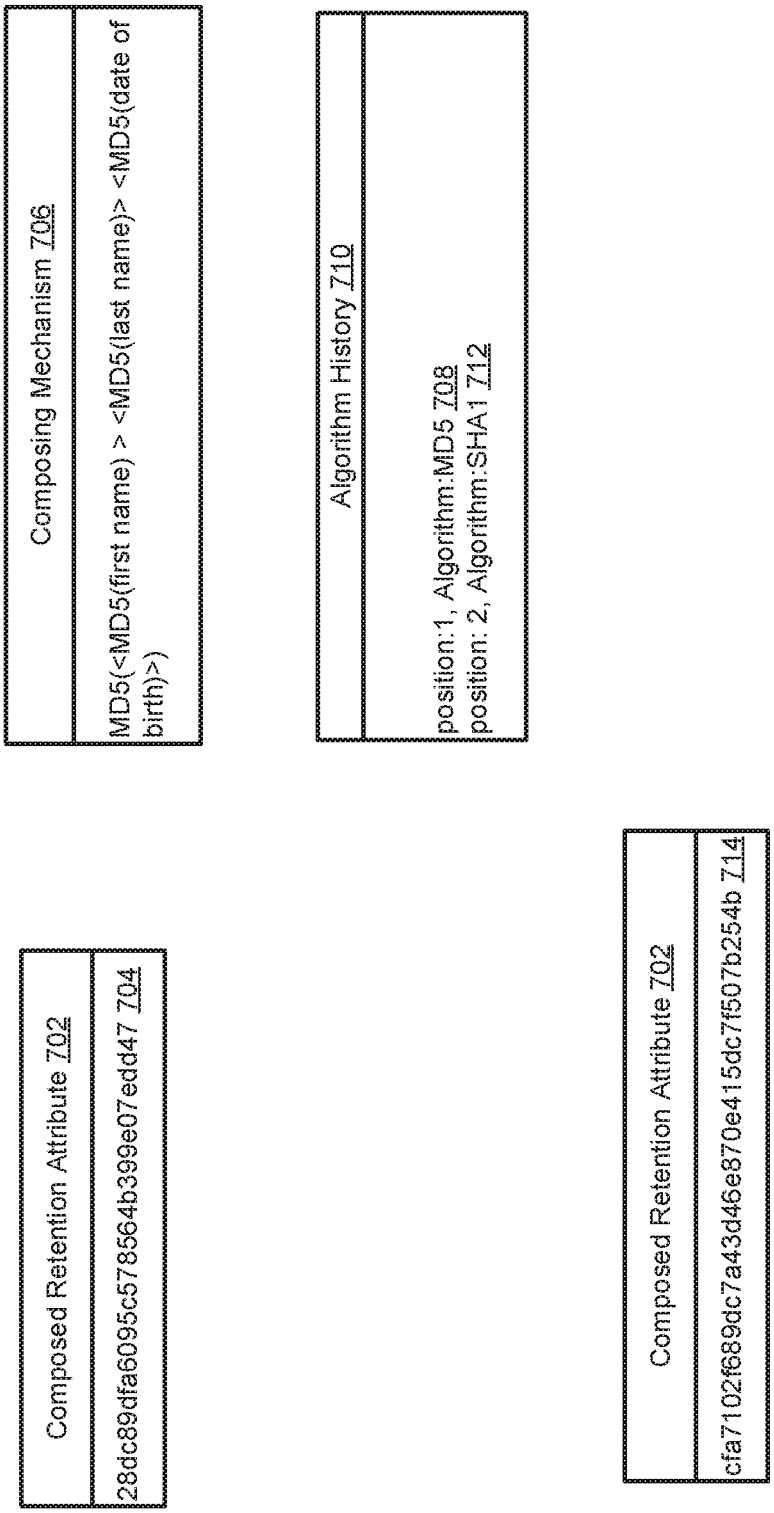
FIG. 7 is a set of tables illustrating data retention using multiple cryptographic hash algorithms, according to one embodiment.

FIG. 7 is a set of tables 700 illustrating data retention using multiple cryptographic hash algorithms, according to one embodiment. In one embodiment, a cryptographic hash algorithm used to compute a hash might become obsolete over a period of time. Therefore, the computed hash may be periodically updated with a latest hash generated using a latest cryptographic hash algorithm providing enhanced security. Consider the composed retention attribute 702 containing the hash '28dc89dfa6095c578564b399e07edd47' 704 generated as explained in FIG. 6. The hash '28dc89dfa6095c578564b399e07edd47' 704 is generated based on the composing mechanism 706. Initially, MD5 (first name), MD5 (last name) and MD5 (date of birth) is computed, and the generated hashes are combined. Since algorithm MD5 is in position 1 as shown in 'position:1 algorithm:MD5' 708 in algorithm history 710, MD5 algorithm is applied on the combined hash. Accordingly, MD5 (MD5 (first name), MD5 (last name) and MD5 (date of birth)) is generated as '28dc89dfa6095c578564b399e07edd47' 704. At a later point of time, MD5 algorithm may become obsolete and a latest cryptographic algorithm such as SHA1 may be used to update the hash '28dc89dfa6095c578564b399e07edd47' 704. To update the composed retention attribute with a latest cryptographic hash algorithm such as SHA1, SHA1 algorithm is applied to the previously computed hash '28dc89dfa6095c578564b399e07edd47' 704. An entry position:2, algorithm:SHA1 712 is made in the algorithm history 710. SHA1 (28dc89dfa6095c578564b399e07edd47) is computed as 'cfa7102f689dc7a43d46e870e415dc7f507b254b'. The new hash replaces the previous hash value in the composed retention attribute 702 as 'cfa7102f689dc7a43d46e870e415dc7f507b254b' 714. To regenerate the hash, a list of the names of all applied cryptographic hash algorithms along with the position or sequence in which they were applied are stored in the algorithm history 710. Two cryptographic hash algorithms shown in the algorithm history 710 are merely exemplary, any number of cryptographic hash algorithms may be used to generate hashes, and stored in the algorithm history 710.

In one embodiment, when semi-identifying attribute values are plain text that originates in a natural language, they follow a common pattern or become predictable in cryptanalysis. To improve the strength of the computed hashes, either a public or private random data is added to the semi-identifying attribute value that is to be hashed. A salt is a random and known public string that is added to the semi-identifying attribute value before hashing. Salt is added as a pre-fix to the semi-identifying attribute value. Adding salt makes brute force attacks on the computed hashes time consuming and resource consuming. Strength of the hash is improved when a different salt is used for the semi-identifying attributes. The salt is stored along with the hash in the composed retention attribute, so that the hash may be recomputed in the same technique. Another technique of adding pepper to the semi-identifying attribute value is used. A random string i.e. pepper is added before hashing but the pepper is a secret value. Pepper is added as a suffix to the semi-attribute value. In one embodiment, a combination of both salt and pepper can be used on the semi-attribute value.

Figure 8:
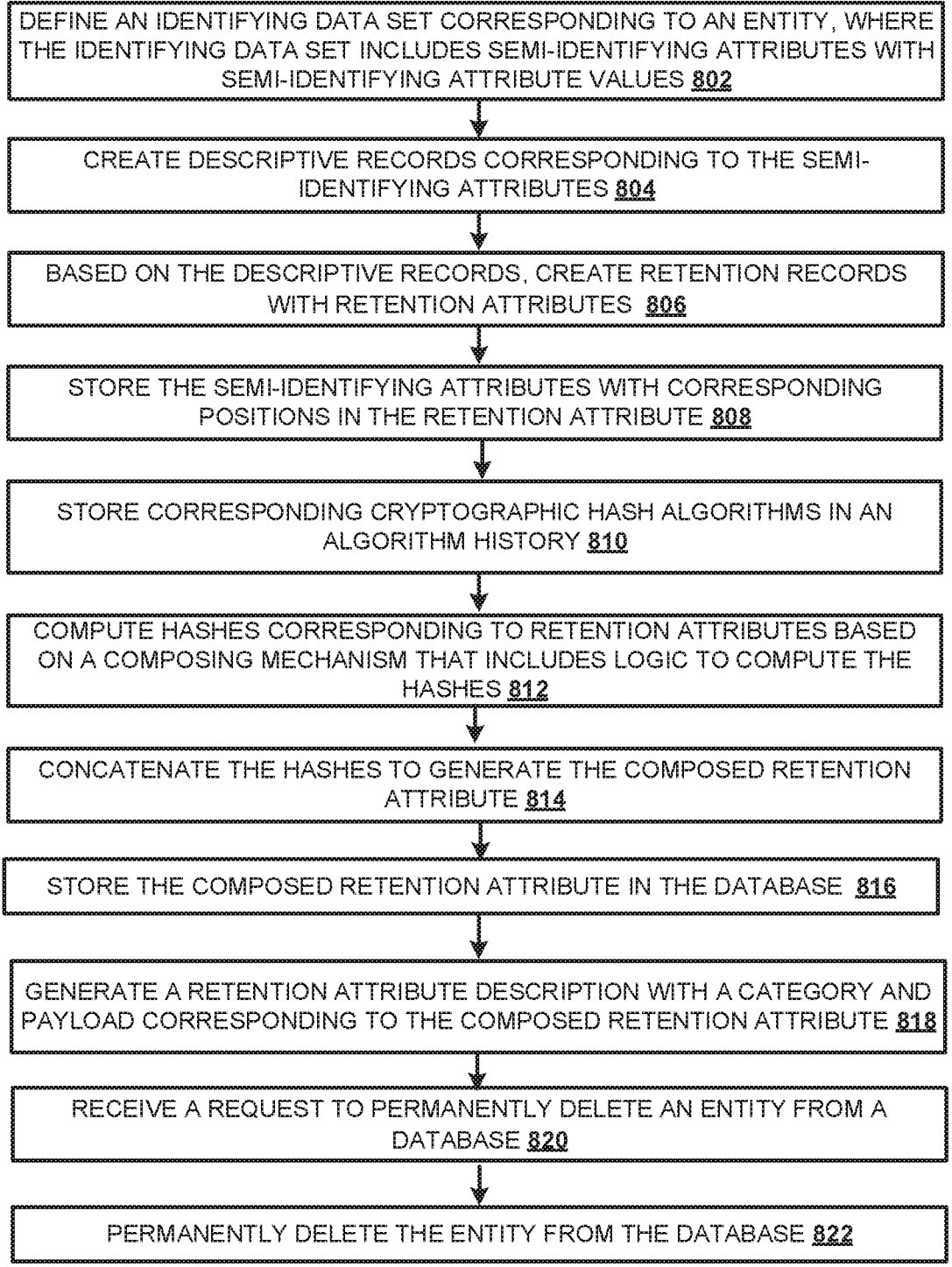
FIG. 8 is a flow chart illustrating data retention management in databases, according to one embodiment.

FIG. 8 is a flow chart 800, illustrating data retention management in databases, according to one embodiment. At 802, an identifying data set corresponding to an entity is defined. The identifying data set includes semi-identifying attributes with semi-identifying attribute values. At 804, descriptive records corresponding to the semi-identifying attributes are created. At 806, based on the descriptive records, retention records with retention attributes are created. At 808, the semi-identifying attributes with corresponding positions are stored in the retention attribute. At 810, corresponding cryptographic hash algorithms are stored in an algorithm history. At 812, hashes corresponding to the retention attributes are computed based on a composing mechanism that includes logic to compute the hashes. At 814, the hashes are concatenated to generate the composed retention attribute. At 816, the composed retention attribute is stored in a database. At 818, a retention attribute description is generated with a category and payload corresponding to the composed retention attribute. At 820, a request is received to permanently delete the entity from the database. At 822, the entity may be permanently deleted from the database.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 9:
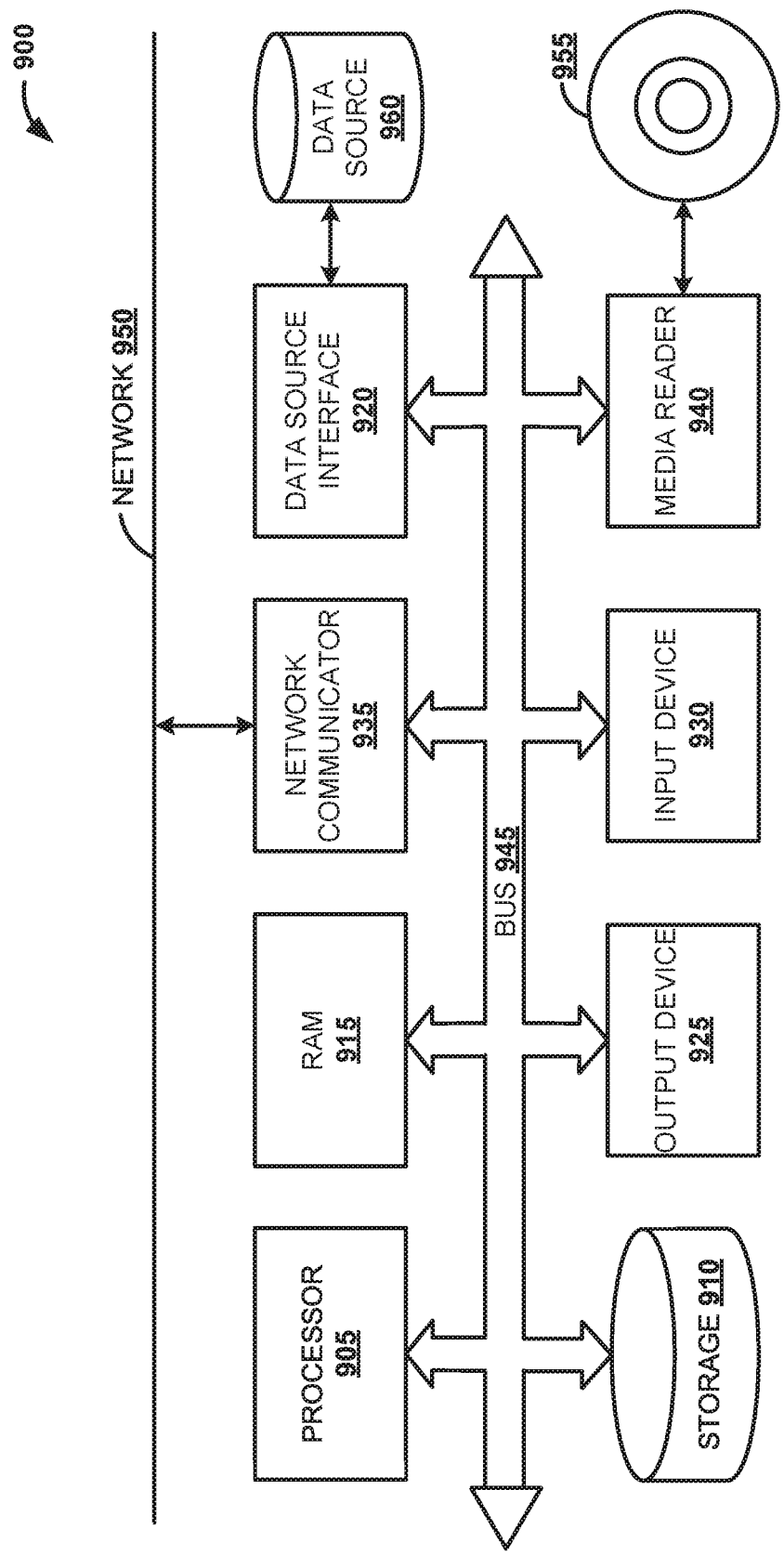
FIG. 9 is a block diagram illustrating an exemplary computer system, according to one embodiment.

FIG. 9 is a block diagram of an exemplary computer system 900. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   define an identifying data set corresponding to an entity, wherein the identifying data set includes semi-identifying attributes with semi-identifying attribute values;
   create descriptive records corresponding to the semi-identifying attributes;

generate hash values for individual semi-identifying attribute values;

based on the descriptive records and generated hash values, create retention records with retention attributes, wherein the retention record persists the generated hash values and descriptive records associated with the entity after the entity is deleted from the database, and wherein each retention attribute stores the semi-identifying attributes and a position of each semi-identifying attribute;

generate a composed retention attribute based on the position of the semi-identifying attribute and on applying cryptographic hash algorithms to each of the retention attributes;

store the composed retention attribute in a database;

receive a request to permanently delete the entity from the database; and based on the request, permanently delete the entity from the database.

2. The computer-readable medium of claim 1, further comprises instructions which when executed by the computer further cause the computer to:

generate a retention attribute description with a category and payload corresponding to the composed retention attribute; and store the retention attribute description in the database.

3. The computer-readable medium of claim 1, further comprises instructions which when executed by the computer further cause the computer to:

store the semi-identifying attributes with corresponding positions in the retention attribute; and store names of the cryptographic hash algorithms in an algorithm history.

4. The computer-readable medium of claim 1, further comprises instructions which when executed by the computer further cause the computer to:

compute hashes corresponding to retention attributes based on a composing mechanism that includes a logic to compute the hashes; and combine the hashes to generate the composed retention attribute.

5. The computer-readable medium of claim 4, further comprises instructions which when executed by the computer further cause the computer to:

receive a request from a new entity with new attributes;

match the new attributes with the identifying data set including the semi-identifying attributes;

based on the descriptive records, retention records, retention attributes, algorithm history and composing mechanism, generate a new composed retention attribute;

match the new composed retention attribute with the composed retention attribute; and upon determining a match, display the retention attribute description.

6. The computer-readable medium of claim 5, wherein generating composed retention attribute, further comprises instructions which when executed by the computer further cause the computer to:

based on the positions of the semi-identifying attributes, identify corresponding cryptographic hash algorithms to be applied to the semi-identifying attributes; and apply the corresponding cryptographic hash algorithms to the new attributes matching the semi-identifying attributes.

7. The computer-readable medium of claim 1, further comprises instructions which when executed by the computer further cause the computer to:

define plurality of identifying data sets corresponding to the entity as equivalent data sets.

8. A computer-implemented method of data retention management in databases, the method comprising:

defining an identifying data set corresponding to an entity, wherein the identifying data set includes semi-identifying attributes with semi-identifying attribute values;

creating descriptive records corresponding to the semi-identifying attributes;

generating hash values for individual semi-identifying attribute values;

based on the descriptive records and generated hash values, creating retention records with retention attributes, wherein the retention record persists the generated hash values and descriptive records associated with the entity after the entity is deleted from the database, and wherein each retention attribute stores the semi-identifying attributes and a position of each semi-identifying attribute;

generating a composed retention attribute based on the position of the semi-identifying attribute and on applying cryptographic hash algorithms to each of the retention attributes;

storing the composed retention attribute in a database;

receiving a request to permanently delete the entity from the database; and permanently deleting the entity from the database.

9. The method of claim 8, further comprising:

generating a retention attribute description with a category and payload corresponding to the composed retention attribute; and storing the retention attribute description in the database.

10. The method of claim 8, further comprising:

storing the semi-identifying attributes with corresponding positions in the retention attribute; and storing names of the cryptographic hash algorithms in an algorithm history.

11. The method of claim 8, further comprising:

computing hashes corresponding to retention attributes based on a composing mechanism that includes a logic to compute the hashes; and combining the hashes to generate the composed retention attribute.

12. The method of claim 11, further comprising:

receiving a request from a new entity with new attributes;

matching the new attributes with the identifying data set including the semi-identifying attributes;

based on the descriptive records, retention records, retention attributes, algorithm history and composing mechanism, generating a new composed retention attribute;

matching the new composed retention attribute with the composed retention attribute; and upon determining a match, displaying the retention attribute description.

13. The method of claim 12, wherein generating composed retention attribute, further comprising:

based on the positions of the semi-identifying attributes, identifying corresponding cryptographic hash algorithms to be applied to the semi-identifying attributes; and applying the corresponding cryptographic hash algorithms to the new attributes matching the semi-identifying attributes.

14. The method of claim 10, further comprising:
defining plurality of identifying data sets corresponding to the entity as equivalent data sets.

15. A computer system for data retention management in databases, comprising:
a computer memory to store program code; and
a processor to execute the program code to:
define an identifying data set corresponding to the entity, wherein the identifying data set includes semi-identifying attributes with semi-identifying attribute values;
create descriptive records corresponding to the semi-identifying attributes;
generate hash values for individual semi-identifying attribute values;
based on the descriptive records and generated hash values, create retention records with retention attributes, wherein the retention record persists the generated hash values and descriptive records associated with the entity after the entity is deleted from the database, and wherein each retention attribute stores the semi-identifying attributes and a position of each semi-identifying attribute;
generate a composed retention attribute based on the position of the semi-identifying attribute and on applying cryptographic hash algorithms to each of the retention attributes; and
store the composed retention attribute in the database.

16. The system of claim 15, wherein the processor further executes the program code to:
generate a retention attribute description with a category and payload corresponding to the composed retention attribute; and
store the retention attribute description in the database.

17. The system of claim 15, wherein the processor further executes the program code to:
store the semi-identifying attributes with corresponding positions in the retention attribute; and
store names of the cryptographic hash algorithms in an algorithm history.

18. The system of claim 15, wherein the processor further executes the program code to:
compute hashes corresponding to retention attributes based on a composing mechanism that includes a logic to compute the hashes; and
combine the hashes to generate the composed retention attribute.

19. The system of claim 18, wherein the processor further executes the program code to:
receive a request from a new entity with new attributes;
match the new attributes with the identifying data set including the semi-identifying attributes;
based on the descriptive records, retention records, retention attributes, algorithm history and composing mechanism, generate a new composed retention attribute;
match the new composed retention attribute with the composed retention attribute; and
upon determining a match, display the retention attribute description.

20. The system of claim 19, wherein generating composed retention attribute further executes the program code to:
based on the positions of the semi-identifying attributes, identify corresponding cryptographic hash algorithms to be applied to the semi-identifying attributes; and
apply the corresponding cryptographic hash algorithms to the new attributes matching the semi-identifying attributes.

* * * * *